United States Patent Office 3,346,295
Patented Oct. 10, 1967

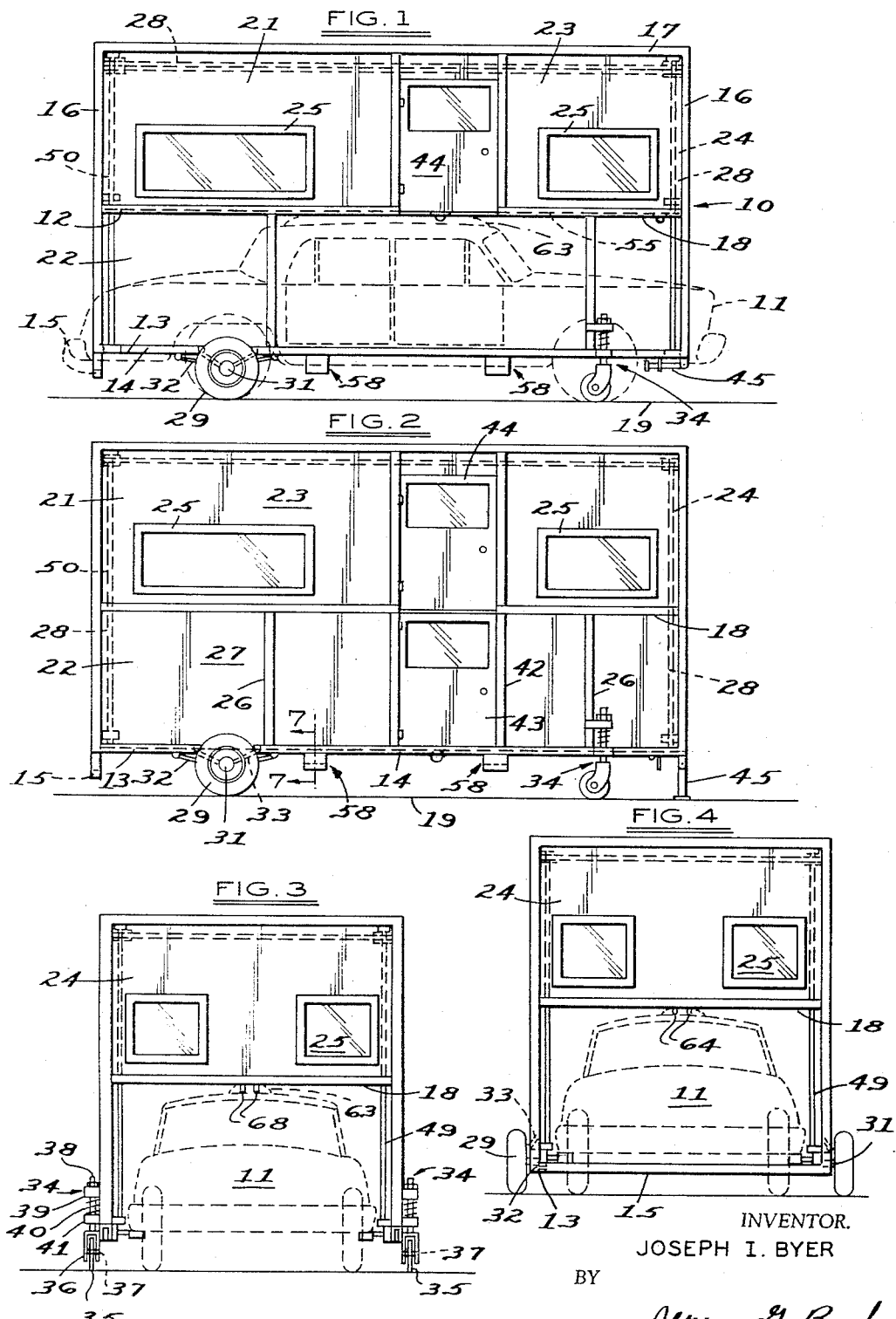

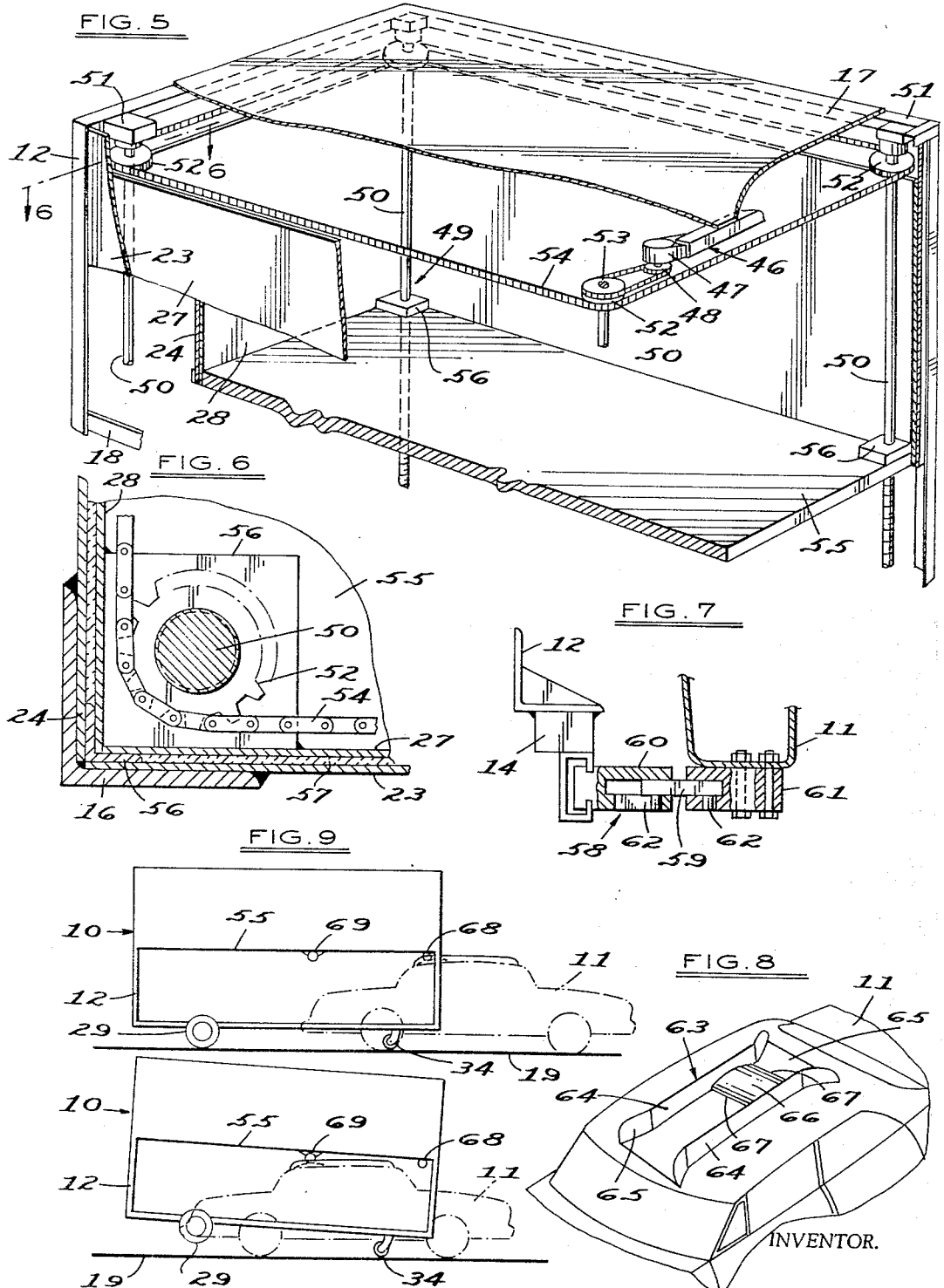

3,346,295
MOBILE HOUSING UNIT
Joseph I. Byer, 2896 Radisson Ave., Windsor
Ontario, Canada
Filed Sept. 7, 1965, Ser. No. 485,441
10 Claims. (Cl. 296—23)

This invention relates to a self-supported mobile housing unit and more particularly to a mobile housing unit that can be propelled by an automobile which is substantially received within and coupled to the unit but can be detached from and moved outside the unit to allow the housing unit to be converted into a full sized camper or mobile home.

There are generally two types of housing units available on the market today, one is a self supported trailer which is attachable by a hitch to the rear of an automobile and a second one is a cabin that is mounted on the body of a pickup truck. Many variations of these two types can be purchased to accommodate large or small families for short or long trips. Trailers can be of a collapsible construction containing tents and other camping equipment or elaborate mobile homes containing complete furnishings. In either case, the trailer is mounted by a hitch to an automobile to be pulled along the highway. This extends the vehicle for all practical purposes for the entire length of the automobile, hitch and trailer approximately ranging in overall length from 30 to 60 feet. Most drivers are not experienced in maneuvering a vehicle of such a length and, therefore, are reluctant to purchase or rent a trailer. Trailers on the highway represent a hazard due to their lack of maneuverability under emergency conditions, due to their obstruction of visibility of the driver and due to their weight, width and length.

A cabin mounted on a bed of a pickup truck overcomes some of these disadvantages. Such a cabin is designed to be removable from the truck bed to permit use of the truck for other purposes. Such cabins weigh substantially and are usually very confining as the size of the bed of a pickup truck and its load capacity are very limited. The use of larger stake trucks to carry a cabin is not very economical due to their high cost of operation.

The mobile housing unit of this invention overcomes most of the disadvantages inherent to a cabin mounted on a pickup truck of a trailer hitched to an automobile.

The mobile housing unit of this invention comprises an integral box-like structure that is self supported by ground engaging wheels. The box-like structure is of a sufficient width to receive at least a large portion of a motor vehicle within the structure. The unit may be shorter or longer in length than the automobile. The structure has an upper part and a lower part with the upper part being provided with stationary side and end walls. The lower part has vertically moveable side and end walls which in their raised position are in a telescopic relationship with the stationary side and end walls so as to provide full visibility for the occupants of an automobile received in the lower part of the unit. In a lowered position, with the automobile removed from the structure, the moveable side and end walls of the lower part are in an extended vertically aligned position with the stationary side and end walls so as to enclose the unit completely to provide a weathertight shelter. An operable mechanism is connected to the moveable side and end walls to move the walls of the lower part from one position to the other position.

In a preferred embodiment, the operable mechanism is a lifting means installed in the structure which is attached to a horizontally extending floor and the lower edges of the moveable side and end walls of the lower part. The lifting means is operative to raise the moveable end and side walls into an adjacent or telescopic relationship with the stationary walls and lift the floor to at least a height sufficient to clear the roof of an automobile. With the floor and walls raised, an automobile can be backed into the lower part, which has one end open, and coupled to the structure to permit the unit to be propelled by the automobile positioned under the upper part. Any furnishings may remain attached to the raised floor and stored within the upper part during travel.

At the destination, the automobile is uncoupled and driven from the mobile unit. Then the lifting means is actuated to lower the floor and the connected moveable side and end walls of the lower part until the floor is a few inches from ground level. A door in the side wall of the lower part permits easy ingress to the completely enclosed weather tight unit which is now ready to accommodate a family. Tarpaulins or portable walls may be used in conjunction with the moveable floor replacing the side and end walls to lower the cost of the mobile unit.

It is an object of this invention to provide a mobile housing unit that is readily maneuverable and is of a sufficient size to accommodate an entire family.

It is a further object of this invention to provide a mobile housing unit which is compact for transport and can be expanded for camping or housing purposes.

It is still a further object of this invention to provide a mobile housing unit that is propelled by a conventional automobile substantially received within the unit and coupled thereto.

Other objects and advantages will become more apparent from the following description, particularly when considered in connection with the accompanying drawings, in which:

FIGURE 1 is a side elevational view of the mobile housing unit of this invention being propelled by an automobile.

FIGURE 2 is a side elevational view of the mobile housing unit prepared for occupancy.

FIGURE 3 is a front elevational view of the mobile housing unit of FIGURE 1,

FIGURE 4 is a rear elevational view of the mobile housing unit of FIGURE 1,

FIGURE 5 is a schematic perspective view, partially in section, of a portion of the mobile housing unit depicting the wall and floor construction, FIGURE 6 is a sectional view taken generally along line 6—6 of FIGURE 5, FIGURE 7 is a sectional view taken generally along line 7—7 of FIGURE 2, FIGURE 8 is a perspective view of a guide means mounted on a roof of a conventional automobile, FIGURE 9 is a diagrammatic side elevational view of the mobile housing unit as it is being aligned with the automobile while the latter is being backed into the unit, and FIGURE 10 is a further diagrammatic side elevational view of the mobile housing unit of the operation illustrated in FIGURE 9.

Referring now to the drawings, in FIGURES 1–4 is seen a mobile housing unit, generally designed as 10. The unit 10 comprises a generally box shaped structure 12 sufficiently large to receive at least a large portion of an automobile 11 and comprising a horizontally extended U-shaped frame 13 at the bottom having two longitudinally extending side rails 14 and one transversely extending end rail 15 at the rear thereof. Four structural angular members 16 extend upwardly, one from each corner of the frame 13. A rectangular roof 17 is attached to the upper corner of each member 16 to substantially define the box-like structure 12. The structure 12 should be at least 8' high and of a sufficient width so that the automobile 11 can be substantially received therein but preferably it will vary between 8 to 12 feet in height. The structure 12 may be shorter or about the same length as shown in the drawings or longer than a conventional motor vehicle. Horizontally extending supports 18 disposed between the roof 17 and ground level 19 divides the structure 12 into an upper part 21 and a lower part 22.

The upper part 21 has two stationary side walls 23 and two end walls 24 directly attached to the structural members 16, roof 17, and supports 18 as best seen in FIGURES 1 and 5. Windows 25 are provided in the side walls 23 and end walls 24.

The lower part 22 has vertical support members 26 to interconnect the frame 13 and the horizontally extending supports 18. As best seen in FIGURES 2 and 5, the lower part 22 has vertically movable side walls 27 and end walls 28 which can be raised by means hereinafter described to a position at which the side and end walls 27, 28 are in a telescopic or adjacent relationship with the stationary side and end walls 23, 24 of the upper part 21 respectively as seen in FIGURES 1, 3 and 4.

As best seen in FIGURES 1 and 4, the rear portion of the mobile housing unit 10 is supported by two pneumatic wheels 29 that are rotatably mounted on a pair of stub axles 31 extending outwardly from the frame 13. Each axle 31 is resiliently supported from the side rails 14 by leaf springs 32 and torsion bars 33 to maintain the wheels 29 in a vertical position.

The front portion of the unit 10 is supported by two independently resiliently mounted wheel units 34 best seen in FIGURE 3. Each wheel unit 34 comprises a free turning caster wheel 35 rotatably supported in a bifurcated bracket 36 by a journal pin 37. A stud 38 extending upwardly from the bracket 36 extends through an apertured bracket 39 attached to one of the support members 26. A coil spring 40 positioned on the stud 38 abuts the bracket 39 and a shoulder 41 carried by the stud 38.

It is to be understood that the rear wheels 29 and front wheel units 34 could be positioned inward of the frame 13 or directly underneath the side rails 14 if the structure 12 is so designed to provide clearance for the respective wheels.

The side walls 27 of the lower part 22 have a framed structure 42 to which a door 43 is hingedly attached to provide egress from and ingress to the interior of the unit 10. The upper side wall 23 may also be provided with a door 44 in vertical alignment with the lower door 43 to provide sufficient headroom and also ingress to the upper part 21 when the movable walls are in a raised position.

A pivotable leg support 45 is provided at each lower corner at the front of the unit 10 which is pivoted into a lowered position to contact the ground 19 as seen in FIGURE 2 when the housing unit 10 is made ready for occupancy to assure its stability. Additional leg supports 45 may be provided at the back of the unit 10 if desired.

For greater clarity, portions of the side and end walls of mobile housing unit 10 are broken away in FIGURE 5 to depict the floor and the lifting and operating mechanisms.

An operating mechanism 46, which is housed by and supported under the roof 17, includes an electric motor 47 having a drive sprocket 48 which can be powered by a storage battery or an external power source or the electrical system of an automobile. A lifting means 49 is provided comprising four jack screws 50 one in each corner of the structure 12 in this instance. Each jack screw 50 has its upper and lower end held in sleeves 51 mounted on the support structure. A sprocket 52 is carried at the top of each jack screw 50 below the upper sleeve 51. A second sprocket 53 is spaced above the first sprocket 52 on the jack screw 50 nearest the mechanism 46. A continuous sprocket chain 54 engages all sprockets 52. The sprocket 53 is drivingly coupled to the drive sprocket 48.

A horizontally extending floor 55 for the unit 10 is supported by the jack screws 50 through threaded bushings 56 which are disposed at each corner of the floor 55. The threaded portions of the jack screws 50 engage the threads of the bushings 56. The floor 55 in the maximum raised position clears the roof of the automobile 11.

By operating the motor 47, the sprocket chain 54 will be driven through sprockets 48, 52, and 53 and one of the jack screws 50 to rotate the three other jack screws 50. This will cause the floor 55 to be lowered to a position a few inches above ground level 19. The floor 55 in its lowered position may be fastened to the frame 13 to provide a rigid structure. To lift the floor 55, the drive is reversed. It is to be understood that hydraulic means or manually operable mechanical means may be readily substituted for the operating mechanism 46 and lifting means 49 shown.

The bottom edges of the side walls 27 and end walls 28 are permanently fastened to the continuous edge of the floor 55 as seen in FIGURE 5. The end walls 28 and side walls 27 are joined at each corner and guided in a vertical direction by the jack screws 50 and by angles 56 that extend vertically and are disposed between the movable end walls 28 and side walls 27 and stationary side walls 23 and end walls 24 as best seen in FIGURE 6.

A sealing means 57 is attached to the overlapping portions of the side walls 23, 27 and end walls 24, 28 to keep wind and rain from entering the spacing between the movable and stationary walls.

As can be readily understood from the description, the floor 55 is lowered from its raised position as seen in FIGURES 1 and 5 upon actuation of the mechanism 46 to a position above ground level 19 as seen in FIGURE 2. The movable side walls 27 and end walls 28 of the lower part 22 will also be lowered as they are attached to the floor 55. The side and end walls 27, 28 vertically move from their telescopic position inward of the stationary side walls 23 and end walls 24 of the upper part 21 to their lowered position in an extended vertical alignment with the stationary walls. The top portions of the movable walls will slightly overlap the bottom portions of the stationary walls with the sealing means 57, such as felt, disposed therebetween.

The frame 13 of the mobile housing unit 10 is provided with a coupling means 58 such as the bolting arrangement shown in FIGURE 7. A bolt 59 is carried in a bracket 60 attached to the side rail 14 as seen in FIGURE 2. A coupling member or bolt receiving means 61 is attached to the underside of the body of the automobile 11. The bracket 60 and receiving means 61 have axially spaced slots 62 to allow the bolt 59 to be conventionally rotated to a locked position in the slots 62.

A further embodiment of this invention is shown in FIGURES 8-10. As best seen in FIGURE 8, a guide means 63, which is attached to the roof of the automobile 11, comprises substantially parallel longitudinally extending guide rails 64 having funnel shaped openings 65 at each end. At the rear of the guide means 63 is a raised platform 66 having inclined surfaces 67 leading from the roof to each end of the platform 66.

Two extensions such as sets of rollers 68, 69 or wheels are mounted to the underside of the floor 55 as seen in FIGURES 1, 9 and 10. The first set of rollers 68 is disposed near the front of the mobile housing unit 10 and the other set of rollers 69 is rearwardly spaced from the first set of rollers 68 approximately at the center of the unit 10.

As can be seen schematically in FIGURES 9 and 10, the automobile 11 with the guide means 63 attached to the roof is backed into the front of the structure 12 having its floor 55 in a raised position. The first set of rollers 68 engage the surface of the raised platform 66 to slightly relieve the weight on the front wheel unit 34 as seen in FIGURE 9. This permits the driver of the automobile 11 to swivel the unit to about its ground engaging rear wheels 29 so as to align the automobile 11 with the frame 13 of the unit 10. As the driver backs the automobile further into the unit 10, the first set of rollers 68 will be disengaged and the second set of rollers 69 will engage the raised platform 66 to lift the rear wheels 29 as seen in FIGURE 10. The driver will then be able to maneuver the automobile 11 completely into the unit 10 by swiveling the unit 10 about the wheel units 34. The automobile 11 is then backed into its final position as seen in FIGURE 1 so as to allow the coupling means 58 on the frame 13, two on each side rail 14, to be transversely aligned with the receiving means 61 attached to the underside of the automobile 11.

As can be readily understood from the description of the invention, a novel light weight mobile housing unit 10 is provided that will house comfortably a family and also allow for all the comfort as ample storage for furnishings, appliances etc. exists. At the same time, the mobile unit 10 is self supported and is propelled by a motor vehicle that is substantially received within the box like structure 12 of the unit 10 and coupled thereto. The mobile housing unit 10 is open at least at one end and of a width sufficient to at least partially encompass a conventional automobile. The floor 55 and the moveable side walls 27 and end walls 28 of the lower part 22 can be raised so as not to interfere with the automobile 11 and obstruct the field of vision for the occupants of the automobile 11 after the automobile has been backed into and coupled to the frame 13 of the unit 10. The floor 55 in its raised position will allow for storage of furnishings and luggage in the upper part 21 of the unit 10 during the propelling of the mobile housing unit 10 by the automobile 11 partially or wholly received in the lower part 22 thereof to its destination. Furniture and appliances with necessary plumbing and electrical connections may be permanently attached to the moveable lower part 22.

The wheels 29 and wheel unit 34 resiliently support the unit 10 on the ground independently of the automobile 11. As seen in FIGURE 3, the wheel units 34 are preferably but not necessarily in approximate alignment with the steerable wheels of the automobile 11 and are freely rotatable to permit the wheel units 34 to follow the path of the steerable wheels of the automobile 11. The independently suspended rear wheels 29 are maintained in a fixed vertical position outwardly of the rear wheels of the automobile as best seen in FIGURE 4.

The coupling means 58 attaches the unit 10 securely at four spaced points to the automobile 11 so that an integral, rigid, self propelled vehicle is effected for travelling on the highway.

Upon reaching the destination, the automobile 11 is uncoupled and driven from within the lower part 22 of the unit 10 to outside of the structure 12. Then the mechanism 46 is actuated thereby causing the rotation of the jack screw 50 to lower the floor 55 and the moveable side walls 27 and end walls 28 from their raised telescopic position to a lowered or extended vertically aligned position with the stationary walls 23, 24. With the floor 55 lowered to a few inches above ground level, and preferably fastened to the frame 13, and the side walls 27 and end walls 28 disposed in their extended position, a large, completely enclosed, rigid housing unit 10 is achieved in which one can readily stand up. The conversion of the mobile housing unit from its partially collapsed position for traveling to a completely extended position for occupancy and vice versa takes only a few minutes of time. As the unit is self-contained complete with furnishings, no setting up of additional equipment is required.

To overcome any difficulties that may be encountered in coupling the unit 10 to the automobile 11, the guide means 63 may be attached to the roof of the vehicle and rollers 68, 69 to the underside of the floor 55. The only other modification to the automobile 11 required is the installation of the coupling member receiving means 61 to the frame or body of the automobile.

As an integral vehicle is achieved by the coupling of the automobile 11 within the structure 12 of the self supported mobile housing unit 10, no difficulties are encountered with maneuvering the unit 10 of this invention on the highway. The overall length of the unit 10 propelled by an automobile partially or wholly received within the structure is substantially less than the length of an automobile with a trailer attached thereto of an equivalent size. Thus, a substantial improvement in safety on the highways is achieved without sacrificing any space or comforts in a mobile housing unit 10. Undue loads on the automobile is avoided as the mobile unit 10 is completely self supported. Wind resistance affects are substantially reduced due to less exposed surface areas which has such advantages as better gas economy and control while traveling on the highway.

It will be understood that this invention is not to be limited to the exact construction shown and described but that various modifications and changes may be made without departing from the spirit and scope of the invention as defined in the appended claims.

I claim:

1. A self-supported mobile housing unit in combinaation with a conventional automobile for propelling said unit, said housing unit comprising a box-like framed structure supported on the ground and including an upper part with stationary upper walls, a lower part with lower walls with at least one of said lower walls being vertically movable, a horizontally extending, vertically movable floor in a lower position being substantially at ground level and within said lower part, said one lower wall and said floor being maintained in perpendicular relationship to each other during vertical movement, and a lifting mechanism carried by said structure and operatively connected to said floor and said one vertically movable lower wall, said lifting mechanism operable to move said floor from the lower position substantially at ground level while being maintained in a horizontal position, to a raised position above roof level of said automobile into said upper part and move said one lower wall from a position in the lower part to a raised position in the upper part adjacent one of said stationary upper walls to define an opening in the lower part of said structure to allow at least a major portion of said automobile to be received underneath said raised floor in said structure.

2. A self-supported mobile housing unit in combination with a detachable conventional automobile for propelling said unit comprising a box-like framed structure fabricated from structural members and having an upper part and a lower part, one end of said lower part being free from structural members, said lower part being of a size sufficient to house at least a large portion of said automobile which may be driven into said lower part through said one end thereof, said upper part having a roof, stationary end and side walls attached to said structural members of said structure, a horizontally extending floor contained within said structure and vertically movable, said lower part having vertically movable side walls and end walls, lifting means carried by and housing within said structure and connected to said floor and said end walls and side walls of said lower part, said one lower wall and said floor being maintained in perpendicular relationship to each other during vertical movement, said lifting means operable to move said vertically movable side and end walls of said lower part and said floor between a lowered position at which said floor is substantially at ground level and said end and side walls are enclosing said lower part and a raised position at which said movable end and side walls are in a telescopic relationship with said stationary end and side walls of said upper part and said floor being at a level slightly higher than the roof of said conventional automobile, and a mechanism manually actuatable and connected to said lifting means for placing the latter in an operating condition.

3. The self-supported mobile housing unit as described in claim 2 and which is further characterized in that at least one of said vertically movable side walls is provided with a door to provide egress from and ingress to said unit when in a lowered position.

4. The self-supported mobile housing unit as described in claim 2 and which is further characterized in that a coupling means is attached to the bottom of said box-like structure to permit coupling said structure to said automobile when said lower part is in a raised position and said automobile is within said lower part.

5. The self-supported mobile housing unit as described in claim 2 and which is further characterized in that said lifting means comprises four jackscrews, one in each corner of said box-like structure.

6. The self-supported mobile housing unit as described in claim 2 and which is further characterized in that said floor is continuously connected to the bottom edges of said vertically movable end and side walls, the bottom edges of said stationary end and side walls overlapping the top edges of said vertically movable side and end walls when in a lowered position, and a sealing means between said overlapping edges so as to provide a sealed unit.

7. The self-supported mobile housing unit as described in claim 4 and which is further characterized in that said ground engaging wheels comprise two front and two rear wheels that are positioned outwardly of said automobile, said wheels being independently, resiliently mounted on said box-like structure.

8. The self-supported mobile housing unit as described in claim 5 and which is further characterized in that said mechanism comprises four sprockets, one carried by each of said jackscrews, a sprocket chain engaging said sprockets and a sprocket driver, said sprocket driver driven by a motor.

9. The self-supported mobile housing unit as described in claim 7 and which is further characterized in that an extension means is attached to the underside of said floor and guide means with a raised portion attached to the roof of said automobile, said extension means being received in said guide means and engaging said raised portion when said automobile is being driven into said lower part of said structure, one set of said wheels being lifted off the ground upon the engagement of said extension means by said raised portion to permit said automobile to be aligned with respect to said unit, said extension means disengaging said raised portion when said automobile is in its finally received position within said lower part of said structure.

10. The self-supporting mobile housing unit as described in claim 9 and which is further characterized in that said extension means comprises longitudinally spaced rollers, the forwardly spaced roller when in engagement with said raised portion of said guide means slightly lifting the front portion of said unit, and the rearwardly spaced roller when in engagement with said raised portion lifting said pair of rear wheels, said rollers in disengagement with said raised portion when said automobile is in its finally received position in the lower part of said structure.

References Cited

UNITED STATES PATENTS 3,289,684  12/1966  Lowe _____ 296—23

FOREIGN PATENTS 1,224,028  2/1960  France.
1,320,238  1/1963  France.

BENJAMIN HERSH, *Primary Examiner.*

PHILIP GOODMAN, *Examiner.*